(12) United States Patent
Khalil et al.

(10) Patent No.: US 8,594,024 B2
(45) Date of Patent: Nov. 26, 2013

(54) MOBILE IP OVER VPN COMMUNICATION PROTOCOL

(75) Inventors: Mohamed Khalil, Murphy, TX (US); Ahmad Muhanna, Richardson, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/506,038

(22) Filed: Mar. 21, 2012

(65) Prior Publication Data
US 2012/0195266 A1    Aug. 2, 2012

Related U.S. Application Data

(63) Continuation of application No. 12/879,964, filed on Sep. 10, 2010, now Pat. No. 8,179,890, which is a continuation of application No. 10/712,879, filed on Nov. 13, 2003, now Pat. No. 7,804,826.

(60) Provisional application No. 60/426,786, filed on Nov. 15, 2002.

(51) Int. Cl.
*H04W 4/00*    (2009.01)

(52) U.S. Cl.
USPC ............................................... 370/328

(58) Field of Classification Search
None
See application file for complete search history.

(56) References Cited

U.S. PATENT DOCUMENTS

| | | | |
|---|---|---|---|
| 7,068,640 B2 * | 6/2006 | Kakemizu et al. ............ 370/349 |
| 7,136,362 B2 | 11/2006 | Chen | |
| 7,213,263 B2 | 5/2007 | Makineni e | |
| 7,574,737 B1 * | 8/2009 | Loh ................................. 726/15 |
| 8,037,302 B2 * | 10/2011 | Vaarala et al. ................ 713/160 |
| 2003/0031151 A1 | 2/2003 | Sharma et al. | |
| 2003/0039234 A1 | 2/2003 | Sharma et al. | |
| 2003/0182431 A1 | 9/2003 | Sturniolo et al. | |
| 2004/0047322 A1 | 3/2004 | O'Neill | |
| 2004/0073642 A1 | 4/2004 | Iyer | |

OTHER PUBLICATIONS

Zao, John and Mat Condell; "Use of IPSec in Mobile IP," Internet Society; Nov. 1997.
Carugi, M. et al; "Service Requirements for Provider Provisioned Virtual Private Networks," Internet Society, Feb. 2002.
Kent, S. and R. Atkinson; "IP encapsulating Security Payload (ESP);" Internet Society; Nov. 1998.
Adrangi, F. (ed); "Problem Statement: Mobile IPv4 Traversal of VPN Gateways;" Internet Society; Jun. 23, 2003.
Vaarala, S. (ed); "Mobile IPv4 Traversal Across IPsec-Based VPN Gateways;" Jun. 28, 2003.
Vaarala, S. (ed); "Mobile IPv4 Traversal Across IPsec-Based VPN Gateways;" Sep. 29, 2003.

(Continued)

*Primary Examiner* — Ayaz Sheikh
*Assistant Examiner* — Blanche Wong
(74) *Attorney, Agent, or Firm* — Meyertons, Hood, Kivlin, Kowert & Goetzel, P.C.

(57) ABSTRACT

The present invention supports a communication protocol for transmission of information packets between a mobile node and a virtual private network. Information packets are encapsulated and decapsulated along the route as the information packet is forwarded among the various networks on its path to the destination address; either the mobile node on a foreign network or a correspondence node on a virtual private network. A home agent on the virtual private network supports transmitting the information packets, and the information packets are transmitted from the virtual private network from the home agent or a virtual private network gateway.

18 Claims, 8 Drawing Sheets

(56) References Cited

OTHER PUBLICATIONS

"Introduction to Mobile IP," Cisco Systems, Apr. 9, 2003.
"Introduction to Mobile IP," Cisco Systems, Oct. 8, 2001.
Cicic, Tarik; "Mobile IP and VPN;" University of Oslo, Dec. 2001.
Sjostrand et al., "Mobile IP and Virtual Private Networks Problem Statement", Feb. 2002, pp. 1-14.
Adrangi et al., "Problem Statement for Mobile IPv4 Traversal Across VPN Gateways", Mar. 2002, pp. 1-18.
Montenegro, G., "Reverse Tunneling for Mobile IP, revised", Jan. 2001, pp. 1-61.
Levkowetz, H., "DHCP Option for Mobile IP Mobility Agents", Jun. 27, 2002, pp. 1-10.

* cited by examiner

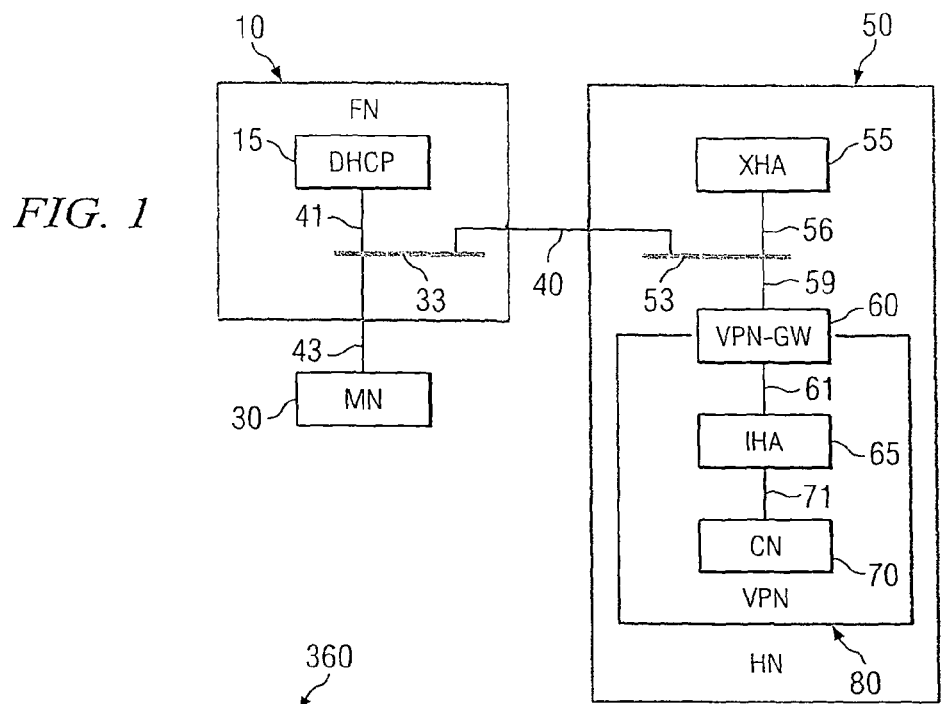
FIG. 1
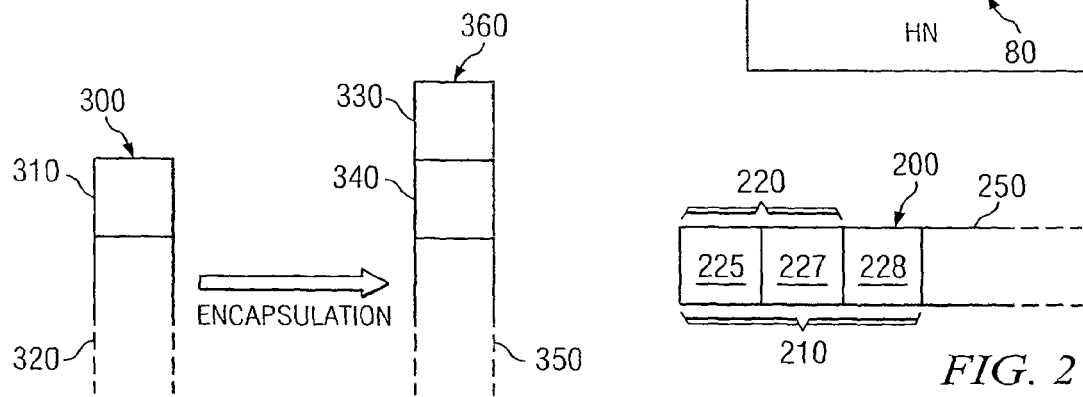
FIG. 2
FIG. 3
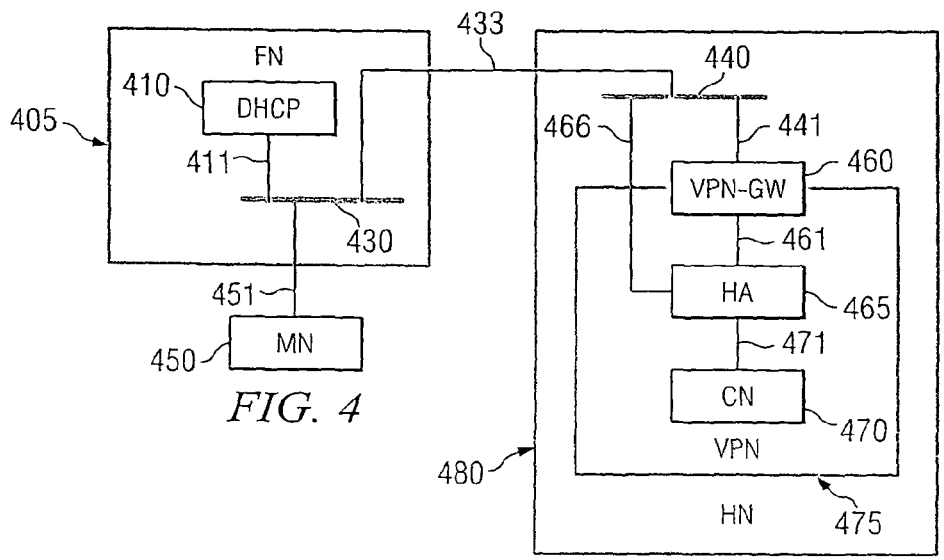
FIG. 4

MOBILE IP OVER VPN COMMUNICATION PROTOCOL

RELATED APPLICATION DATA

This application is related to Provisional Patent Application Ser. No. 60/426,786 filed on Nov. 15, 2002, and priority is claimed for this earlier filing under 35 U.S.C. §119(e), and this application is a continuation application of Utility patent application Ser. No. 12/879,964 filed Sep. 10, 2010, which is a continuation application of Utility patent application Ser. No. 10/712,879 filed on Nov. 13, 2003, and priority is claimed for this earlier filing under 35 U.S.C. §120. The Provisional Patent Application and prior Utility patent applications are incorporated by reference into this utility patent application.

TECHNICAL FIELD OF THE INVENTION

A communication protocol for information packet transmissions from a Virtual Private Network in a mobile IP session.

BACKGROUND OF THE INVENTION

The Internet, like so many other high tech developments, grew from research originally performed by the United States Department of Defense. In the 1960s, the military had accumulated a large collection of incompatible computer networks. Because of their incompatible data structures and transmission protocols, many of these computers could not communicate with other computers across network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

TCP/IP Addressing and Routing

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

TCP/IP network protocols define how routers determine the transmission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

Routing tables can be configured manually with routing table entries or with a dynamic routing protocol. A manual routing table can be configured upon initialization. In a dynamic routing protocol, routers update routing information with periodic information packet transmissions to other routers on the network. The dynamic routing protocol accommodates changing network topologies, network architecture, network structure, layout of routers, and interconnection between hosts and routers.

The IP-Based Mobility System

The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

While coupled to a foreign network, the Mobile Node will be assigned a care-of address. This is a temporary IP address assigned by the foreign network. The care-of address is used by routers on the foreign network to route information packets addressed to the Mobile Node. While residing on a foreign network, a Mobile Node may move from one location to another, changing its connectivity to the network. This movement changes the physical location of the Mobile Node and requires updating routing tables and/or care-of addressing to keep up with the movement of the Mobile Node.

The Mobile Node keeps the Home Agent informed of its current location by registering a care-of address with the Home Agent. Essentially, the care-of address represents the current foreign network address where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address. In some system architectures and protocols, Foreign Agents also participate in transmission of information packets to a resident Mobile Node. Foreign Agents will receive information packets forwarded from the Home Agent to de-tunnel and forward to the Mobile Node. Further, the Foreign Agent serves as a default router for out-going information packets generated by the mobile node while connected to the foreign network. Foreign Agents and Home Agents can route information packets using successive transmission hops to route information packets from router-to-router to and from a Mobile Node. The registered care-of address identifies the location on a foreign network of the Mobile Node, and the Home Agent and Foreign Agent use this care-of address for routing information packets to and from the foreign network.

Virtual Private Networks

A Virtual Private Network (VPN) emulates a private network over a shared physical infrastructure. By way of example, a VPN can reside within a local area network (LAN) system or on several different networks. A VPN can also span multiple computer systems.

A VPN can be used to extend the communication capabilities of a corporate network to remote offices, which will support the use of the Internet, extranet, or dial-up services. In this way, connectivity to the VPN network is provided in the same manner as a dedicated private network, but there is no need to provide all the equipment and support infrastructure at a remote location.

A service provider, or other network structure, provides the remote physical system and computer infrastructure within which the "virtual" VPN network resides. In this manner, the VPN can function much the same as a single, physical network even though there are intervening host infrastructures and communications traverse network boundaries. A number of different types of VPNs are suggested in RFC 2764, but this is by no means an exhaustive list of possible VPN constructs. The distinguishing hallmark of a VPN is a single, logical network found on a public or private computer infrastructure with the VPN residing upon one or more autonomous systems. Typically, VPN communication over the public infrastructure uses secured information packet transmission.

Tunneling And Secured Information Packet Transmission

Tunneling is the basic methodology in IP communication by which an information packet is routed to the appropriate Internet node through an intermediate Internet address. To emulate the point-to-point connections of a private network, VPN methodology uses secure tunnels to handle information packet transmission across the public infrastructure.

Typically, an information packet with network routing can be encapsulated with IP address information. Encapsulation involves adding an outer IP header to the original IP header fields. In this manner, a "tunnel" can be constructed. The outer IP header contains a source and destination IP address—the "endpoints" of the tunnel. The inner IP header source and destination addresses identify the original sender and destination addresses.

The original sender and recipient addresses for the information packet remain unchanged after encapsulation, while the new "tunnel" endpoint addresses are appended onto the original information packet. This appended address information alters the original IP routing by delivering the information packet to an intermediate destination node (in mobile IP network, typically a foreign agent router), where the encapsulated information packet is "decapsulated" or "de-tunneled" yielding the original information packet. The packet is then delivered to the destination address found in the original IP address based on the associated routing table entries on network routers.

The "tunnel" is established by encapsulating an information packet containing the original IP address of the mobile node (and payload data) and an IP source address with the intermediate routing IP address (i.e. care-of address) of the foreign network. In the more specialized application of VPNs, the tunnels can be secured by encryption and authentication protocols. These security protocols ensure integrity and confidentiality of information packet data transmission during a communication session. Encrypted information packet payloads are generally identified with an Encapsulated Security Payload Header (ESP), which contains data to provide confidentiality, data origin authentication, connectionless integrity, an anti-replay service (a form of partial sequence integrity), and limited traffic flow confidentiality services.

By encapsulating the data with an IP header, an encrypted information packet can be routed securely over the public communication infrastructure between the foreign network, the mobile node, and the home network. During transit through the tunnel over the public communication infrastructure, the information packet data payload being transmitted is encrypted, and the encrypted data can only be deciphered using private encryption keys that permit the encryption algorithms at the mobile node and the correspondence node it is communicating with to decode the data as well as encrypt the data. A VPN gateway on the home network will usually perform encryption and decryption services at the boundary of the VPN or at the Correspondence Node. The foreign network or Mobile Node will decrypt or encrypt the information packet for communication with the home network.

For Mobile IP to function in a VPN communication session, the methodology embodied by communication protocols must maintain communication connections. Implementation scenarios require a mobile host (e.g. Mobile Node) on a foreign network to maintain a secure communication link to a secured domain (e.g. a VPN). This emerging Mobile IP application within a VPN environment does not have an established communication protocol for maintaining secured information packet transmission between a roaming mobile node and its home VPN using a public infrastructure. There is a need for a communication protocol to transmit information packets between a Mobile Node and a VPN that offers flexibility. The invention simplifies and enhances the efficiency of communication between a MN and a VPN compared to other suggested methods.

SUMMARY OF THE INVENTION

The invention is a communication protocol for maintaining a secure communication link between a mobile node and a correspondence node on a VPN using a public foreign network and communication infrastructure. A single home agent on the VPN supports communication between a correspondence node on the VPN and a mobile node linked to a public communication network. An internet key exchange (IKE) procedure is performed to setup private encryption keys for encryption and decryption of information packets on the VPN between a VPN gateway and the mobile node.

Encrypted information packets are transmitted between the VPN gateway and the mobile node. Decrypted or non-encrypted information packets are routed between a correspondence node and the VPN gateway. Information packets transmitted between the mobile node and the correspondence node undergo successive encapsulation/decapsulation during routing. In the invention, no more than one home agent is required for communication. Also, optimized communication can take place without encapsulation/decapsulation at the home agent.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 1 is a schematic diagram of an architecture for a mobile IP wireless communications network featuring a VPN on the home network using more than one home agent;

FIG. 2 is a representation of an information packet;

FIG. 3 a general representation of an original information packet and an encapsulated information packet used for tunneling;

FIG. 4 is a schematic diagram of an architecture for a mobile IP wireless communications network featuring a VPN with a public home address for the mobile node using the invention;

DETAILED DESCRIPTION OF THE PREFERRED EMBODIMENTS

Figure 5:
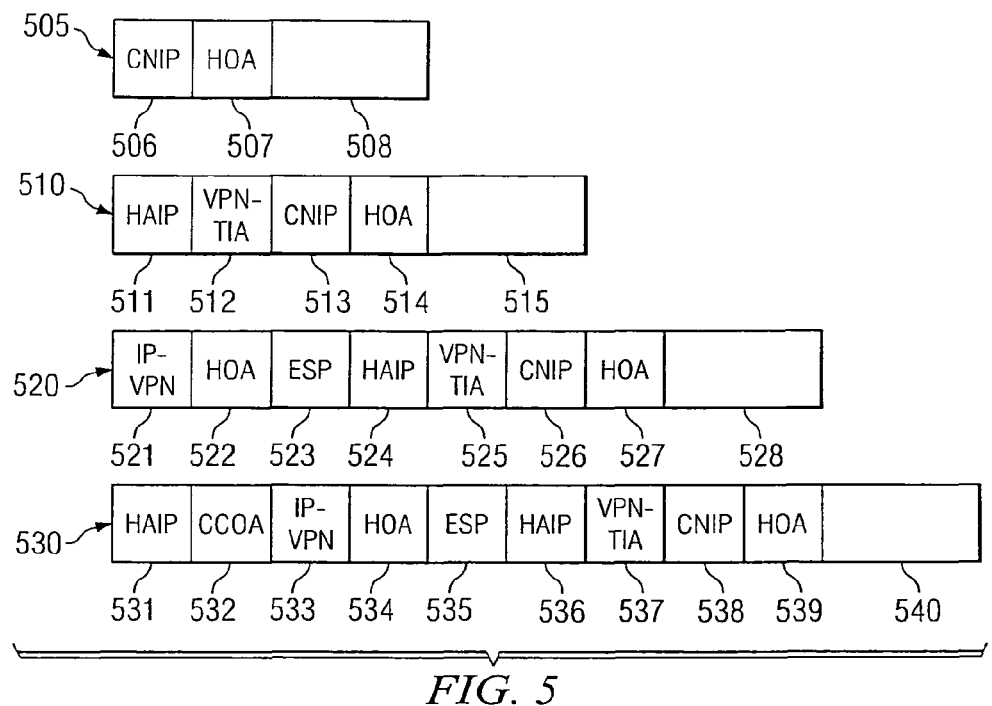
FIG. 5 is the encapsulation process of the information packet for the network of FIG. 4 on the forward path.

FIG. 1 shows a suggested methodology for implementing mobile IP communication to a VPN different from the invention proposed by the Internet Engineering Taskforce. A foreign network 10 includes a Dynamic Host Configuration Protocol (DHCP) server 15. The DHCP server 15 is connected to a buss line 33 by communication link 42. A Mobile Node (MN) 30 is connected to the buss line 33 by communication link 43. In a typical mobile IP application, the communication link 43 includes a wireless connection. The DHCP 15 and the MN 30 communicate using information packets transmitted over communication link 41, the buss line 33, and communication link 43.

A home network 50 for the MN 30 includes an exterior home agent (xHA) 55. The xHA 55 connects to a buss line 53 by communication link 56. A VPN gateway (VPN-GW) 60 connects to the buss line 53 by communication link 59. The VPN-GW 60 is located on the boundary to a secured domain—the VPN 80—on the home network 50. The VPN 60 is a security gateway that secures information packet transmission to and from the VPN 80. The VPN-GW 60 connects to an inner home agent (iHA) 65 located within the VPN 80. A correspondence node (CN) 70 connects to the iHA 65 using communication link 71.

The foreign network 10 and home network 50 transmit information packets back and forth using a communication link 40. Communication link 40 connects buss line 33 and buss line 53. Information packets routed between the MN 30 and the CN 70 use the xHA 55, the VPN-GW 60, and the iHA 65. Encapsulating address headers steps are added at the iHA 65, VPN-GW 60, and xHA 55 on information packets transmitted between the CN 70 and the MN 30. In this solution, two home agents are required.

The general format of an information packet used on packet-based communication systems is shown in FIG. 2. Information packets use an encoding format of "1" and "0" data bits to build a data stream that a computer can interpret. The information packet 200 has header data 210 that includes an IP address header 220 providing routing instructions for transport over an IP communication system. The IP header 220 typically contains an IP source address 225 and an IP destination address 227. Other header data types 228 can be included such as an Encryption Security Payload (ESP) header or User Datagram Protocol (UDP) header. The actual length and format of the IP address header 220 is dependent on the actual communication protocol being used (e.g. IPv4 or IPv6). The information packet 200 also contains a variable length data payload section 250 that contains the actual information being transmitted from the originating source to the destination source.

The basic encapsulation sequence used to route information packets is shown in FIG. 3. The original information packet 300 contains an IP address header 310 that includes IP addresses for both the destination and the source of the information packet 300. The data payload 320 is the actual data being transmitted. In encapsulation, an outer header 330 is added to the information packet 300. This yields an encapsulated information packet 360 comprising an outer header 330 (typically an IP address) with the address for the tunnel entry and exit points, the IP Header 340 comprising the IP address of the destination and the source, and the payload data 350.

FIG. 4 shows one embodiment for the invention for communication between a foreign network and a VPN with a public home address for the MN. A public home address is an IP address that can be used from any IP-based communication network for Internet communication. An IP communication device connected to an IP network can communicate information packets using this public home address.

A foreign network 405 includes a DHCP 410 server connected to a buss line 430 by communication link 411. A MN 450 connects to the buss line 430 by communication link 451. Communication link 451 for most mobile IP communication will include a wireless connection (e.g. cellular phone service connection), but in alternate embodiments this link may be a wired link with the MN 450 using some type of user plug-in connector (e.g. laptop computer through a phone modem).

The foreign network 405 is connected to the MN's 450 home network 480 by communication link 433. Communication link 433 connects the buss line 430 to a buss line 440 on the home network 480. Communication link 441 links a VPN-GW 460 to the buss line 440. The VPN-GW 460 is a security gateway encrypting and decrypting information packets to and from a VPN 475 organized on the HN 480. The VPN 475 includes a HA 465 connected to the VPN-GW 460 by communication link 461, and a CN 470 connected to the HA 465 by communication link 471. The HA 465 also has a communication link 466 connected to buss line 440.

In this embodiment, a public home address (HOA) designates the IP address of the MN 450. The VPN-GW 460 possesses an IP address (IP-VPN) designation. The HA 465 also possesses an IP address (HAIP) designation, and the CN 470 has an IP address (CNIP). During a registration procedure at the start of a communication session, a colocated care-of IP address is also assigned to the MN 450 by the DHCP 410 corresponding to the IP address location of the MN 450 on the foreign network 405 that is used to route information packets from the VPN 475 on the home network 480.

FIG. 5 shows the encapsulation process for the invention of the network configuration of FIG. 4 for information packets transmitted from the correspondence node to the mobile node on the forward path. At communication startup, the MN 450 initiates a registration protocol to obtain a colocated care-of address on the foreign network 405 from the DHCP 410. The HA 465 sets up a VPN tunnel with the VPN-GW 460 by registering a routing table association for the HOA and a VPN tunnel inner address (VPN-TIA) to use for tunneling information packets to the MN 450. The colocated care-of address (CCOA) is also registered in a routing table association with the public home address designation (HOA) for the MN 450 on the HA 465.

Additionally, the VPN-GW 460 and the MN 450 perform internet key exchange (IKE) negotiations to exchange encryption keys, methods, and authentication information. This information is used by the security protocol to encrypt the information packet. Acceptable security algorithms for the key exchange include Message Digest 5 (MD5), Secure Hash Algorithm (SHA), and a Diffie-Hellman combination algorithm using a public and private encryption key. A number of encryption algorithms may be available, including Data Encryption Standard (DES), Triple Data Encryption Standard (3DES), Rivest-Shamir-Aldeman (RSA), ElGamal, RC2 and RC4.

The HA 465 also sets up a VPN tunnel with the VPN-GW 460 to register an association for the HOA and a VPN tunnel inner address (VPN-TIA) to use for tunneling information packets to the MN 450. This VPN-TIA can be setup during IKE negotiations, assigned manually, or by some other means. After this registration and initialization protocol, communication can occur between the MN 450 and the CN 470.

The first information packet 505 is transmitted from the CN 470 to the HA 465. The CNIP 506 is the IP address for the CN 470 and is the source IP address for the information packet 505. The destination IP address HOA 507 is the home address designation of the MN 450. The payload data 508 in the information packet 505 is the actual information being transmitted. At the HA 465, the HA 465 examines its routing table associations to determine where to forward the information packet 505. From the information in the routing table and routing algorithm, the HA 465 encapsulates the information packet 505 to form information packet 510 for routing to the VPN 460 by appending a new source and destination IP address.

The information packet 510 is transmitted from the HA 465 to the VPN-GW 460 using communication link 461. The HAIP 511 is the IP address for the HA 465 or source IP address. The destination address VPN-TIA 512 is the tunnel inner address for the VPN-GW 460 used to route information packets transmitted within the VPN 475 to the VPN-GW 460. The CNIP 513 and HOA 514 are the original source and destination IP address respectively and remain unchanged as does the data payload 515 compared to the CNIP 506, HOA 507, and data payload 508.

At the VPN-GW 460, the information packet 510 is encrypted and an ESP 523 header added. The encrypted information packet 510 is then encapsulated to form the third information packet 520. Information packet 520 includes the new source IP address IP-VPN 521, which is the IP address for the VPN-GW 460. The new destination IP address HOA 522 is the IP address for the MN 450 on the VPN 480. The ESP 523 contains security protocol data. The HAIP 524, VPN-TIA 525, CNIP 526, HOA 527, and payload data 528 are encrypted, but otherwise remain unchanged from the HAIP 511, VPN-TIA 512, CNIP 513, HOA 514, and payload data 515 in information packet 510.

The information packet 520 is transmitted from the VPN-GW 460 back to the HA 465. The HA 465 again examines its routing tables entries for an association for the destination address HOA 522. The HA 465 then encapsulates information packet 520 to form the fourth information packet 530. A new source IP address HAIP 531, corresponding to the IP address for HA 465, is appended. A new destination IP address CCOA 532, corresponding to the colocated IP address of the MN 450, is also appended. The IP-VPN 533, HOA 534, ESP 535, HAIP 536, VPN-TIA 537, CNIP 538, HOA 539, and payload data 540 remain unchanged compared to the IP-VPN 521, HOA 522, ESP 523, HAIP 524, VPN-TIA 525, CNIP 526, HOA 527, and payload data 528 of information packet 520. This secured information packet 530 is then transmitted to the MN 450, which decapsulates and decrypts the information packet 530 to recover the original information.

Figure 5A:
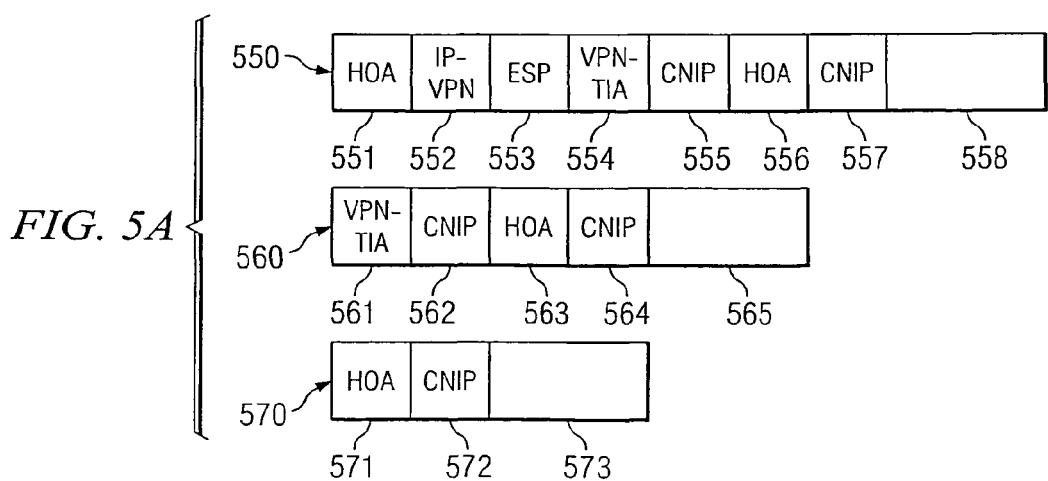
FIG. 5A is the encapsulation process of the information packet for the network of FIG. 4 on the reverse path.

FIG. 5A shows the encapsulation process for the invention of the network configuration of FIG. 4 for information packets transmitted from the mobile node to the correspondence node on the reverse path. Information packet 550 is formed by MN 450 for transmission to the CN 470. HOA 551 is the source IP address for the MN 450 on the home network 480 within the VPN 475. The IP-VPN 552 is the destination address for the VPN-GW 460 securing the VPN 475. ESP 553 contains data to provide confidentiality and signifies that the remaining portion of information packet 550 is encrypted. The VPN-TIA 554 is the address for the VPN tunnel inner address for the VPN 460 used in the VPN 475. The CNIP 555 is the IP address for CN 470. HOA 556 is the public home address for the MN 450 on the VPN 475 and the ultimate source address, and the CNIP 557 is the IP address for the CN 470 and the ultimate destination address for the information packet 550. The data payload 558 is the data actually being transmitted to the CN 470.

Information packet 550 is received at the destination VPN-GW 460 and decapsulated to reveal the encrypted information packet 560 with the ESP 553 header appended. The ESP 553 is processed and the information packet 560 decrypted. The VPN-TIA 561 is the VPN tunnel inner address for the VPN 460 and is the source address for the information packet 560. The CNIP 562 is the destination address for the CN 470 on the VPN 475. The HOA 563 is the public home address for the MN 450 and the ultimate source address, and the CNIP 564 is the IP address for the CN 470 and the ultimate destination address for the information packet 560. The data payload packet 565 is the data actually being transmitted to the CN 470.

The VPN-GW 460 forwards the information packet 560 to the HA 465. The HA 465 decapsulates the information packet 560 to form information packet 570. The information packet 570 includes the source IP address HOA 571, the destination IP address CNIP 572, and the data payload 573. The CN 470 receives the information packet 570 and decapsulates it to reveal the data payload 573 which can then be processed by the CN 470.

Figure 6:
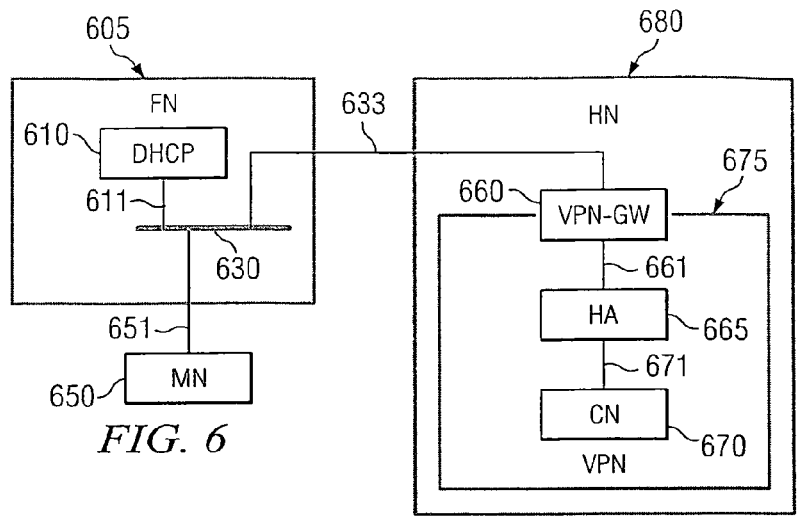
FIG. 6 is a schematic diagram of an architecture for a mobile IP wireless communications network featuring a VPN with a private home address for the mobile node using the invention.

FIG. 6 shows an embodiment for the invention for communication between a foreign network and a VPN with a private home address for the MN. A private home address is an IP address that can only be used within a specific subnetwork.

A foreign network 605 includes a DHCP 610 server connected to a buss line 630 by communication link 611. A MN 650 connects to the buss line 630 by communication link 651. Communication link 651 for most mobile IP communication will include a wireless connection (e.g. cellular phone service connection), but in alternate embodiments this link may be a wired link with the MN 650 using some type of user plug-in connector (e.g. laptop computer through a phone modem).

The foreign network 605 is connected to the MN's 650 home network 680 by communication link 633. Communication link 633 connects the buss line 630 to a VPN-GW 660 on the home network 680. The VPN-GW 660 is a security gateway encrypting and decrypting information packets to and from a VPN 675 organized on the HN 680. The VPN 675 includes a HA 665 connected to the VPN-GW 660 by communication link 661, and a CN 670 connects to the HA 665 by communication link 671.

In this preferred embodiment, a private home address (HOA) designates the IP address of the MN 650. The VPN-GW 660 possesses an IP address (IP-VPN) designation. The HA 665 also possesses an IP address (HAIP) designation, and the CN 670 has an IP address (CNIP). During a registration procedure at the start of a communication session, a colocated care-of IP address is also assigned to the MN 650 by the DHCP 610 corresponding to the IP address location of the MN 650 on the foreign network 605 that is used to route information packets from the VPN 675 on the home network 680.

Figure 7:
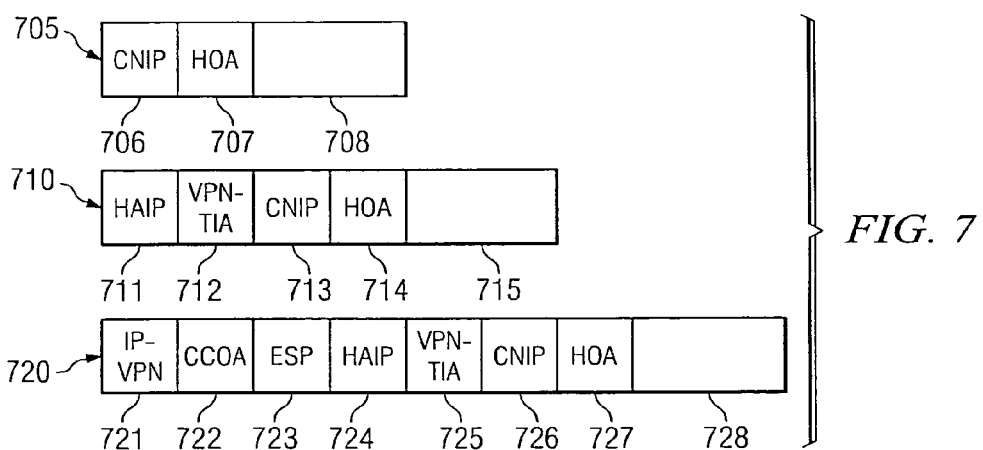
FIG. 7 is the encapsulation process of the information packet for the network of FIG. 6 on the forward path.

FIG. 7 shows the encapsulation process for the invention of the network configuration of FIG. 6 for communication from the CN to the MN on the forward path. At communication startup, the MN 650 initiates a registration protocol to obtain a colocated care-of address on the foreign network 605 from the DHCP 610. The HA 665 sets up a VPN tunnel with the VPN-GW 660 by registering a routing table association for the HOA and a VPN tunnel inner address (VPN-TIA) to use for tunneling information packets to the MN 650. The colocated care-of address (CCOA) is also registered in a routing table association with private home address designation (HOA) for the MN 650 on the HA 665.

Additionally, the VPN-GW 660 and the MN 650 perform internet key exchange (IKE) negotiations to exchange encryption keys, methods, and authentication information. This information is used by the security protocol to encrypt the information packet. Acceptable security algorithms for the key exchange include Message Digest 5 (MD5), Secure Hash Algorithm (SHA), and a Diffie-Hellman combination algorithm using a public and private encryption key. A number of encryption algorithms may be available, including Data Encryption Standard (DES), Triple Data Encryption Standard (3DES), Rivest-Shamir-Aldeman (RSA), ElGamal, RC2 and RC4.

The HA 665 also sets up a VPN tunnel with the VPN-GW 660 to register an association for the HOA and a VPN tunnel inner address (VPN-TIA) to use for tunneling information packets to the MN 650. This VPN-TIA can be setup during IKE negotiations, assigned manually, or by some other means. After this registration and initialization protocol, communication can occur between the MN 650 and the CN 670.

The first information packet 705 is transmitted from the CN 670 to the HA 665. The CNIP 706 is the IP address for the CN 670 and is the source IP address for the information packet 705. The destination IP address HOA 707 is the home address designation of the MN 650. The payload data 708 in the information packet 705 is the actual information being transmitted. At the HA 665, the HA 665 examines its routing table associations to determine where to forward the information packet 705. From information in the routing table and routing algorithm, the HA 665 encapsulates the information packet 705 to form information packet 710 for routing to the VPN-GW 660 by appending a new source and destination IP address.

The information packet 710 is transmitted from the HA 665 to the VPN-GW 660 using communication link 661. The HAIP 711 is the IP address for the HA 665 or source IP address. The destination address VPN-TIA 712 is the tunnel inner address for the VPN-GW 660 used to route information packets transmitted within the VPN 675 to the VPN-GW 660. The CNIP 713 and HOA 714 are the original source and destination IP address respectively and remain unchanged as does the data payload 715 compared to the CNIP 706, HOA 707, and data payload 708.

At the VPN-GW 660, the information packet 710 is encrypted and an ESP 723 header added. The encrypted information 710 is then encapsulated to form the third information packet 720. Information packet 720 includes the new source IP address IP-VPN 721, which is the IP address for the VPN-GW 660. The new destination IP address CCOA 722 is the IP address for the MN 650 on the foreign network 605. The ESP 723 contains security protocol data. The HAIP 724, VPN-TIA 725, CNIP 726, HOA 727, and payload data 728 are encrypted, but otherwise remain unchanged from the HAIP 711, VPN-TIA 712, CNIP 713, HOA 714, and payload data 715 in information packet 710. The information packet 720 is then transmitted from the VPN-GW 660 to the MN 650 on the foreign network 605. The MN 650 processes the secured information packet 720 to decapsulate and decrypt the information packet 720 to recover the original information.

Figure 7A:
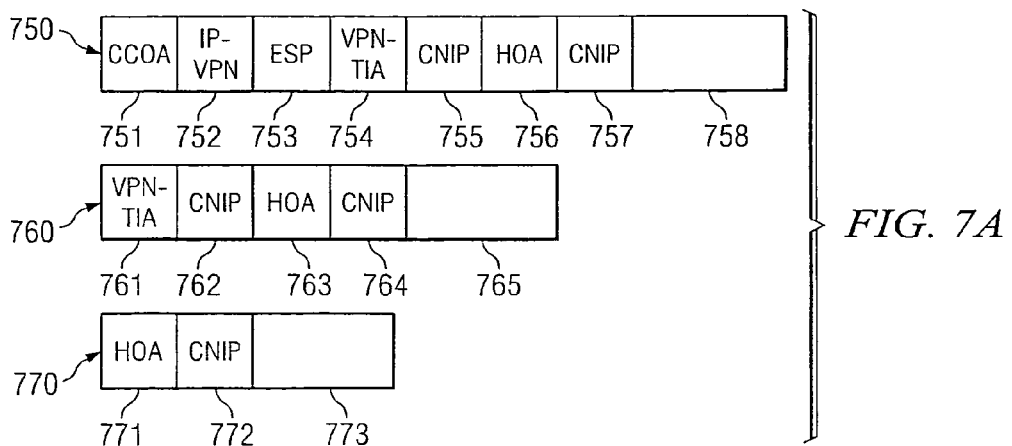
FIG. 7A is the encapsulation process of the information packet for the network of FIG. 6 on the reverse path.

FIG. 7A shows an encapsulation process for the invention of the network configuration of FIG. 6 for information packets transmitted from the mobile node to the correspondence node on the reverse path. Information packet 780 is formed by MN 650 for transmission to the CN 670. CCOA is the colocated care-of source IP address for the MN 650 associated with the home address of the MN 650 in the routing table of the HA 665 on the home network 680 within the VPN 675. The IP-VPN 752 is the destination address for the VPN-GW 660 securing the VPN 675. ESP 753 contains data to provide confidentiality and signifies that the remaining portion of information packet 750 is encrypted. The VPN-TIA 754 is the address for the VPN tunnel inner address for the VPN 660 used in the VPN 675. The CNIP 755 is the IP address for CN 670. HOA 756 is the private home address for the MN 650 on the VPN 675 and the ultimate source address, and the CNIP 757 is the IP address for the CN 670 and the ultimate destination address for the information packet 750. The data payload 758 is the data actually being transmitted to the CN 670.

Information packet 750 is received at the destination VPN-GW 660 and decapsulated to reveal the encrypted information packet 760 with the ESP 753 header appended. The ESP 753 is processed and the information packet 760 decrypted. The VPN-TIA 761 is the VPN tunnel inner address for the VPN 660 and is the source address for the information packet 760. The CNIP 762 is the destination address for the CN 670 on the VPN 675. The HOA 763 is the private home address for the MN 650 and the ultimate source address, and the CNIP 764 is the IP address for the CN 670 and the ultimate destination address for the information packet 760. The data payload packet 765 is the data actually being transmitted to the CN 670.

The VPN-GW 660 forwards the information packet 760 to the HA 665. The HA 665 decapsulates the information packet 760 to form information packet 770. The information packet 770 includes the source IP address HOA 771 (e.g. the MN 650), the destination IP address CNIP 572 (e.g. the CN 670), and the data payload 573. The CN 670 receives the information packet 770, decapsulates it to reveal the data payload 573, and then processes the data payload 573.

Figure 7B:
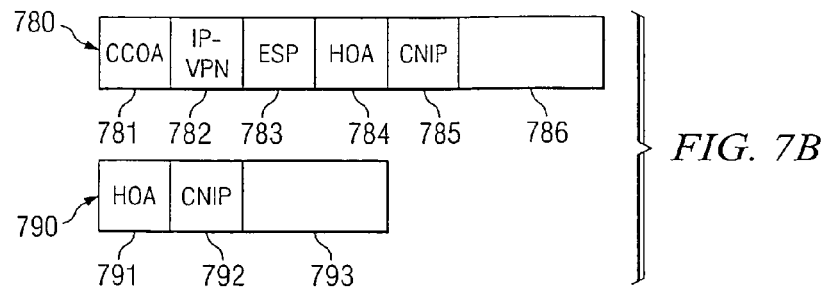
FIG. 7B is the encapsulation process of the information packet for the network of FIG. 6 on the reverse path using optimized communication that does not require decapsulation by the home agent.

FIG. 7B shows an encapsulation process for the invention of the network configuration of FIG. 6 for information packets for an optimized transmission compared to that shown in FIG. 7A from the mobile node to the correspondence node on the reverse path. In this optimization, the information packet is routed to the destination address from the VPN-GW 660. The information packet 780 is formed by MN 650 for transmission to the CN 670. CCOA 781 is the colocated care-of source IP address for the MN 650 location at the foreign network 605. The IP-VPN 782 is the destination address for the VPN-GW 660 securing the VPN 675. ESP 783 contains data to provide confidentiality and signifies that the remaining portion of information packet 780 is encrypted. The HOA 784 is the private home address for the MN 650 on the VPN 675 and the ultimate source address, and the CNIP 785 is the IP address for the CN 670 and the ultimate destination address for the information packet 780. The data payload 786 is the data actually being transmitted to the CN 670.

Information packet 780 is received at the destination VPN-GW 660 and decapsulated to reveal the encrypted information packet 790 with the ESP 783 header appended. The ESP 783 is processed and the information packet 780 decrypted. The HOA 791 is the private home address for the MN 650 and the ultimate source address, and the CNIP 792 is the IP address for the CN 670 and the ultimate destination address for the information packet 790. The data payload packet 793 is the data actually being transmitted to the CN 670. The VPN-GW 660 forwards the information packet 790 to the CN 670 without the information packet being processed by the HA 665. The CN 670 receives the information packet 770, decapsulates it to reveal the data payload 573, and then processes the data payload 573.

Figure 8:
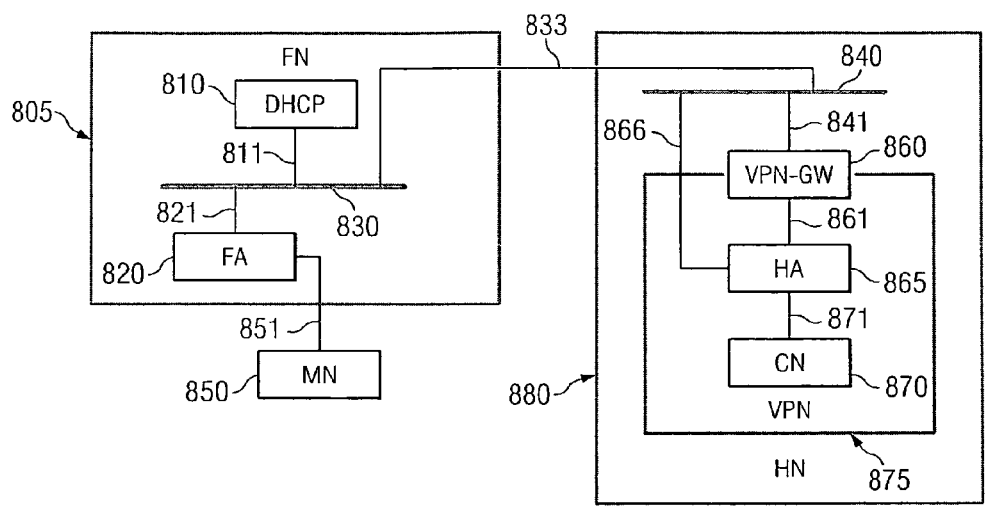
FIG. 8 is a schematic diagram of an architecture for a mobile IP wireless communications network featuring a VPN with a public home address for the mobile node and a foreign agent using the invention.

FIG. 8 shows an embodiment for the invention for communication between a foreign network and a VPN with a public home address for the MN and a care-of address for the MN on a foreign agent. A public home address is an IP address that can be used from any IP-based communication network for Internet communication. An IP communication device connected to an IP network can communicate information packets using this public home address.

A foreign network 805 includes a DHCP 810 server connected to a buss line 830 by communication link 811. A foreign agent 820 also connects to the buss line 830 by communication link 821. A MN 850 connects to the foreign agent 820 by communication link 851. Communication link 851 for most mobile IP communication will include a wireless connection (e.g. cellular phone service connection), but in alternate embodiments this link may be a wired link with the MN 850 using some type of user plug-in connector (e.g. laptop computer through a phone modem).

The foreign network 805 connects to the MN's 850 home network 880 by communication link 833. Communication link 833 connects the buss line 830 to a buss line 840 on the home network 880. Communication link 841 links a VPN-GW 860 to the buss line 840. The VPN-GW 860 is a security gateway encrypting and decrypting information packets to and from a VPN 875 organized on the HN 880. The VPN 875 includes a HA 865 connected to the VPN-GW 860 by communication link 861, and a CN 870 connects to the HA 865 by communication link 871. The HA 865 also has a communication link 866 connected to buss line 841.

In this preferred embodiment, a public home address (HOA) designates the IP address of the MN 850, which is assigned a foreign agent care-of address (FCOA) corresponding to the location of the MN 850 connection to the foreign network 805. The VPN-GW 860 possesses an IP address (IP-VPN) designation. The HA 865 also possesses an IP address (HAIP) designation, and the CN 870 has an IP address (CNIP). During a registration procedure at the start of a communication session, a foreign agent care-of IP address (FCOA) is assigned to the MN 850 by the DHCP 810 or the FA 820 corresponding to the IP address location of the MN 850 on the foreign network 805 used to route information packets from the VPN 875.

Figure 9:
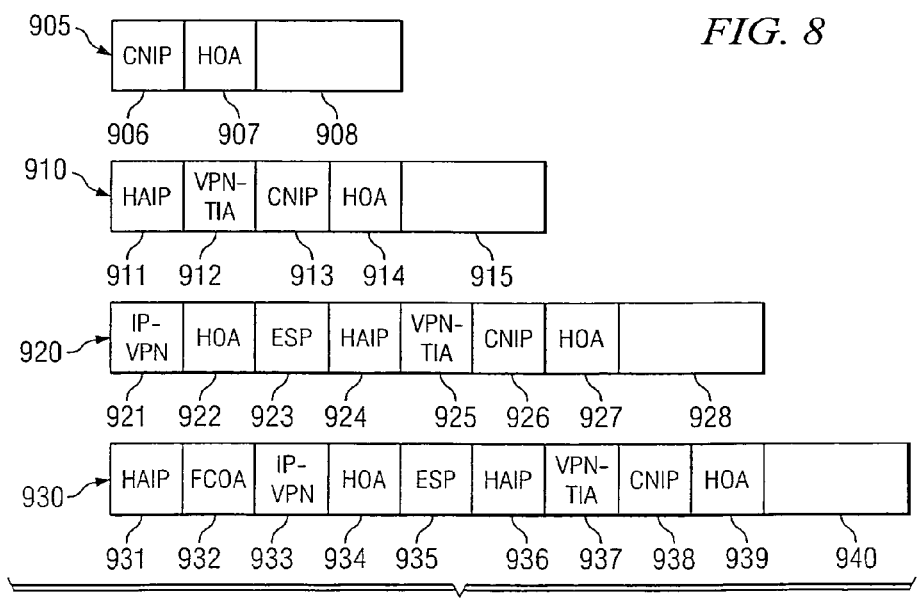
FIG. 9 is the encapsulation process of the information packet for the network of FIG. 8 on the forward path.

FIG. 9 shows the encapsulation process for the invention of the network configuration of FIG. 8 on the reverse communication path. At communication startup, the MN 850 initiates a registration protocol to obtain a foreign agent care-of address on the foreign network 805 from the DHCP 810 or the foreign agent 850. The HA 865 sets up a VPN tunnel with the VPN-GW 860 by registering a routing table association for the HOA and a VPN tunnel inner address (VPN-TIA) to use for tunneling information packets to the MN 850. The FCOA is also registered in a routing table association with public home address designation (HOA) for the MN 850 on the HA 865.

Additionally, the VPN-GW 860 and the MN 850 perform internet key exchange (IKE) negotiations to exchange encryption keys, methods, and authentication information. This information is used by the security protocol to encrypt the information packet. Acceptable security algorithms for the key exchange include Message Digest 5(MD5), Secure Hash Algorithm (SHA), and a Diffie-Hellman combination algorithm using a public and private encryption key. A number of encryption algorithms may be available, including Data Encryption Standard (DES), Triple Data Encryption Standard (3DES), Rivest-Shamir-Aldeman (RSA), ElGamal, RC2 and RC4.

The HA 865 also sets up a VPN tunnel with the VPN-GW 860 to register an association for the HOA and a VPN tunnel inner address (VPN-TIA) to use for tunneling information packets to the MN 850. This VPN-TIA can be setup during IKE negotiations, assigned manually, or by some other means. After this registration and initialization protocol, communication can occur between the MN 850 and the CN 870.

The first information packet 905 is transmitted from the CN 870 to the HA 865. The CNIP 906 is the IP address for the CN 870 and is the source IP address for the information packet 905. The destination IP address HOA 907 is the home address designation of the MN 850. The payload data 908 in the information packet 905 is the actual information being transmitted. At the HA 865, the HA 865 examines its routing table associations to determine where to forward the information packet 905. From the information in the routing table and routing algorithm, the HA 865 encapsulates the information packet 905 to form information packet 910 for routing to the VPN-GW 860 by appending a new source and destination IP address.

The information packet 910 is transmitted from the HA 865 to the VPN-GW 860 using communication link 861. The HAIP 911 is the IP address for the HA 865 or source IP address. The destination address VPN-TIA 912 is the tunnel inner address for the VPN-GW 860 used to route information packets transmitted within the VPN 875 to the VPN-GW 860. The CNIP 913 and HOA 914 are the original source and destination IP address respectively and remain unchanged as does the data payload 915 compared to the CNIP 906, HOA 907, and data payload 908.

At the VPN-GW 860, the information packet 910 is encrypted and an ESP 923 header appended. The encrypted information packet 910 is then encapsulated to form the third information packet 920. Information packet 920 includes the new source IP address IP-VPN 921, which is the IP address for the VPN-GW 860. The new destination IP address HOA 922 is the IP address for the MN 850 on the VPN 880. The ESP 923 contains security protocol data. The HAIP 924, VPN-TIA 925, CNIP 926, HOA 927, and payload data 928 are encrypted, but otherwise remain unchanged from the HAIP 911, VPN-TIA 912, CNIP 913, HOA 914, and payload data 915 in information packet 910.

The information packet 920 is transmitted from the VPN-GW 860 back to the HA 865. The HA 865 again examines its routing table entries for an association for the destination address HOA 922. The HA 865 then encapsulates information packet 920 to form the fourth information packet 930. A new source IP address HAIP 931, corresponding to the IP address for HA 865, is appended. A new destination IP address FCOA 932, corresponding to the foreign agent IP address of the MN 850, is also appended. The IP-VPN 933, HOA 934, ESP 935, HAIP 936, VPN-TIA 937, CNIP 938, HOA 939, and payload data 940 remain unchanged compared to the IP-VPN 921, HOA 922, ESP 923, HAIP 924, VPN-TIA 925, CNIP 926, HOA 927, and payload data 928 of information packet 920. This secured information packet 930 is then transmitted to the FA 820 for forwarding to the MN 850, which decapsulates and decrypts the information packet 930 to recover the original information.

Figure 10:
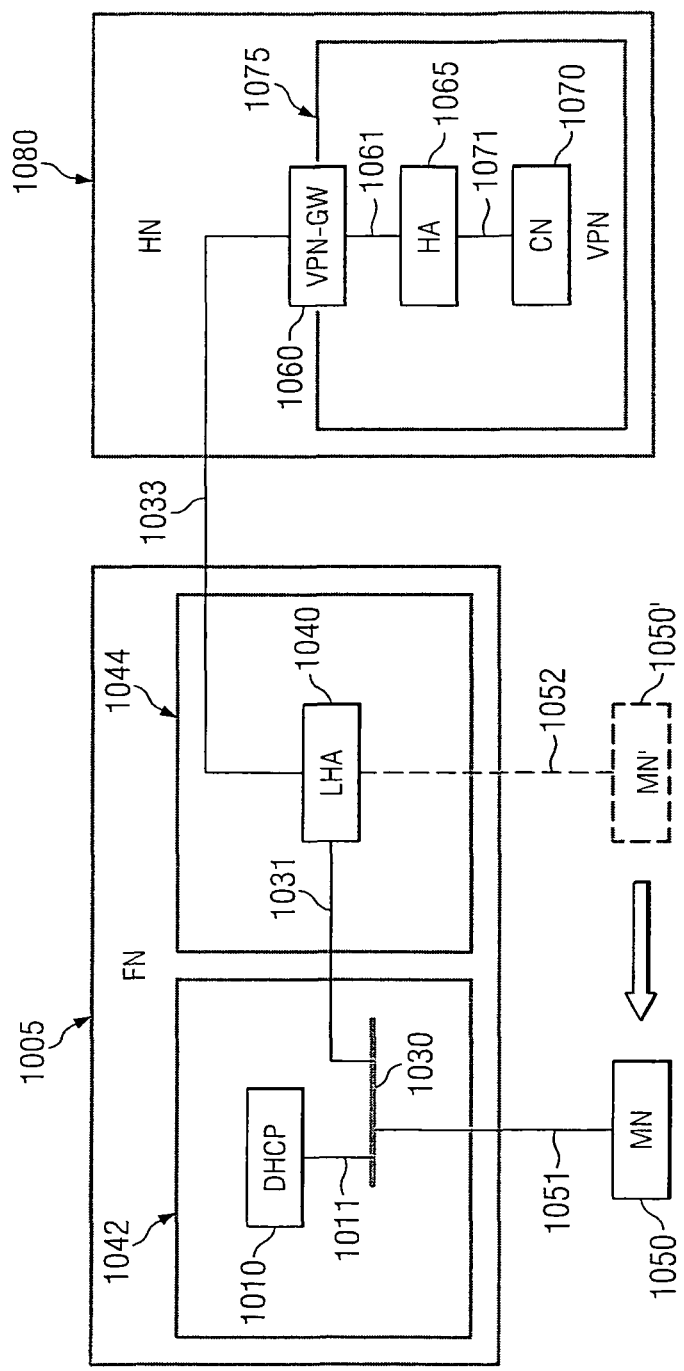
FIG. 10 is a schematic diagram of an architecture for a mobile IP wireless communications network featuring a VPN with a private home address for the mobile node performing a hand-off from a first sub-network to a second sub-network on a foreign network using the invention.

FIG. 10 shows an embodiment for the invention for communication between a foreign network and a VPN with a private home address for the MN performing a hand-off from a first sub-network to a second sub-network on the foreign network. A private home address is an IP address that can only be used within a specific sub-network.

A foreign network 1005 includes two sub-networks. The first sub-network 1044 includes a Local Home Agent (LHA) 1040 routing information packets to a first location for a MN 1050' over communication link 1052. The second sub-network 1042 includes a DHCP 1010 server connected to a buss line 1030 by communication link 1011. A MN 1050 connects to the buss line 1030 by communication link 1051, which is the MN 1050 new location after a hand-off is performed. Communication link 1051 and communication link 1052 will include a wireless connection (e.g. cellular phone service connection). A communication link 1031 connects the LHA 1040 on the first sub-network to the buss line 1030 of the second sub-network on the foreign network 1005.

The foreign network 1005 connects to the MN's 1050 home network 1080 by communication link 1033 from the LHA 1040 to a VPN-GW 1060 on the home network 1080. The VPN-GW 1060 is a security gateway encrypting and decrypting information packets to and from a VPN 1075 organized on the HN 1080. The VPN 1075 includes a HA 1065 connected to the VPN-GW 1060 by communication link 1061, and a CN 1070 connected to the HA 1065 by communication link 1071.

In this preferred embodiment, a private home address (HOA) designates the IP address of the MN 1050. The VPN-GW 1060 possesses an IP address (IP-VPN) designation. The HA 1065 also possesses an IP address (HAIP) designation, and the CN 1070 has an IP address (CNIP). During a registration procedure at the start of a communication session, a colocated care-of IP address is also assigned to the MN 1050' by the LHA 1040 or a DHCP (not shown) corresponding to the IP address location of the MN 1050' on the sub-network 1044 that is used to route information packets from the VPN 1075 on the home network 1080. During a hand-off procedure when shifting from MN 1050' to MN 1050, a colocated care-of IP address is assigned to the MN 1050 by the DHCP 1010 corresponding to the IP address location of the MN 1050 on the sub-network 1042 that is used to route information packets from the sub-network 1044.

Figure 11:
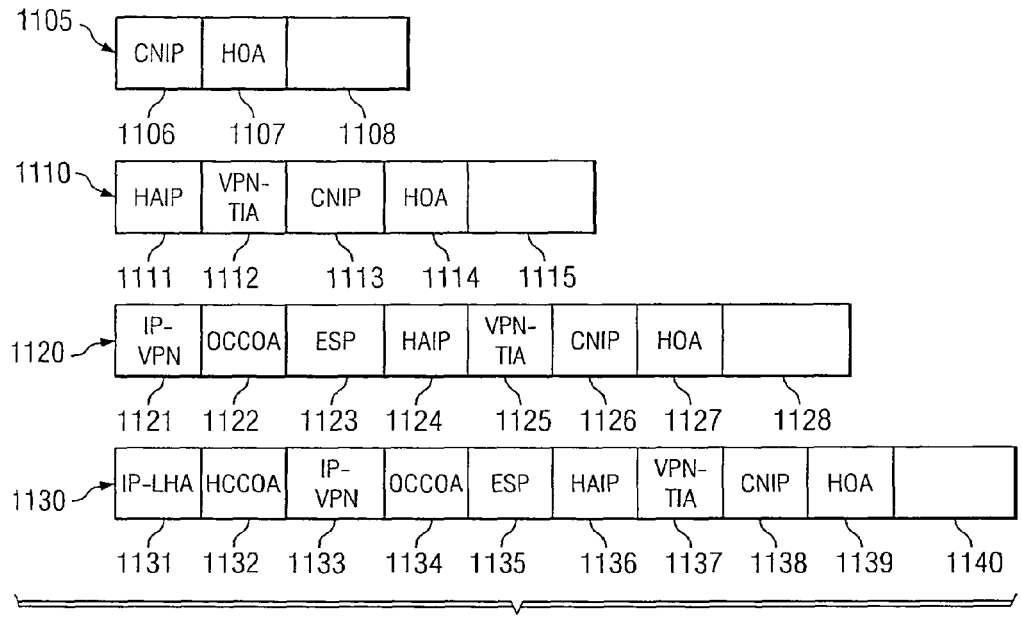
FIG. 11 is the encapsulation process of the information packet for the network of FIG. 10 on the forward path.
Figure 12:
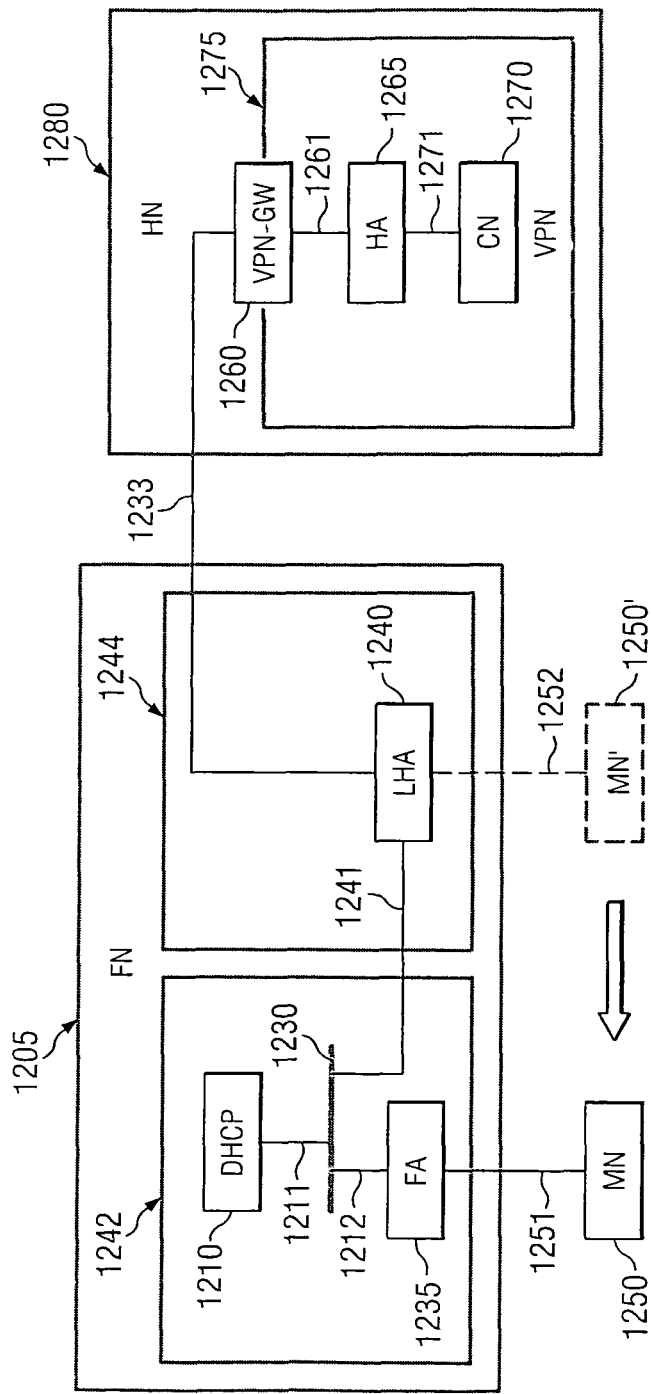
FIG. 12 is a schematic diagram of an architecture for a mobile IP wireless communications network featuring a VPN with a private home address for the mobile node performing a hand-off from a first sub-network to a second sub-network on a foreign network having a foreign agent using the invention.

FIG. 11 shows the encapsulation process for the invention of the network configuration of FIG. 12. At communication startup, the MN 1050' initiates a registration protocol to obtain a colocated care-of address on the sub-network 1044 from the LHA 1040. The HA 1065 sets up a VPN tunnel with the VPN-GW 1060 by registering a routing table association for the HOA and a VPN tunnel inner address (VPN-TIA) to use for tunneling information packets to the MN 1050'. The colocated care-of address (CCOA) is also registered in a routing table association with private home address designation (HOA) for the MN 1050' on the HA 1065.

Additionally, the VPN-GW 1060 and the MN 1050' perform internet key exchange (IKE) negotiations to exchange encryption keys, methods, and authentication information. This information is used by the security protocol to encrypt the information packet. Acceptable security algorithms for the key exchange include Message Digest 5 (MD5), Secure Hash Algorithm (SHA), and a Diffie-Hellman combination algorithm using a public and private encryption key. A number of encryption algorithms may be available, including Data Encryption Standard (DES), Triple Data Encryption Standard (3DES), Rivest-Shamir-Aldeman (RSA), ElGamal, RC2 and RC4.

The HA 1065 also sets up a VPN tunnel with the VPN-GW 1060 to register an association for the HOA and a VPN tunnel inner address (VPN-TIA) to use for tunneling information packets to the MN 1050'. This VPN-TIA can be setup during IKE negotiations, assigned manually, or by some other means. The LHA 1040 routes information packets to the MN 1050'. After this registration and initialization protocol, communication can occur between the MN 1050' and the CN 1070.

During communication, the MN 1050' changes its connection to a new sub-network 1042 on the foreign network 1005. During hand-off registration, the LHA 1040 registers an association for the prior or old CCOA (OCCOA) and the new CCOA (NCCOA) where the MN 1050 connects in a routing table. The LHA 1040 routes received information packets addressed to the OCCOA to the NCCOA for the MN 1050 during the communication session.

The first information packet 1105 is transmitted from the CN 1070 to the HA 1065. The CNIP 1106 is the IP address for the CN 1070 and is the source IP address for the information packet 1105. The destination IP address HOA 1107 is the home address designation of the MN 1050. The payload data 1108 in the information packet 1105 is the actual information being transmitted. At the HA 1065, the HA 1065 examines its routing table associations to determine where to forward the information packet 1105. From information in the routing table and routing algorithm, the HA 1065 encapsulates the information packet 1105 to form information packet 1110 for routing to the VPN-GW 1060 by appending a new source and destination IP address.

The information packet 1110 is transmitted from the HA 1065 to the VPN-GW 1060 using communication link 1061. The HAIP 1111 is the IP address for the HA 1065 or source IP address. The destination address VPN-TIA 1112 is the tunnel inner address for the VPN-GW 1060 used to route information packets transmitted within the VPN 1075 to the VPN-GW 1060. The CNIP 1113 and HOA 1114 are the original source and destination IP address respectively and remain unchanged as does the data payload 1115 compared to the CNIP 1106, HOA 1107, and data payload 1108.

At the VPN-GW 1060, the information packet 1110 is encrypted and an ESP 1123 header added. The encrypted information packet 1110 is then encapsulated to form the third information packet 1120. Information packet 1120 includes the new source IP address IP-VPN 1121, which is the IP address for the VPN-GW 1060. The new destination IP address OCCOA 1122 is the old IP address for the MN 1050' on the foreign network 1005 before changing to MN 1050. The ESP 1123 contains security protocol data. The HAIP 1124, VPN-TIA 1125, CNIP 1126, HOA 1127, and payload data 1128 are encrypted, but otherwise remain unchanged from the HAIP 1111, VPN-TIA 1112, CNIP 1113, HOA 1114, and payload data 1115 in information packet 1110. The information packet 1120 is then transmitted from the VPN-GW 1060 to the LHA 1040 at the old colocated care-of address (OCCOA 1122) for the MN 1050'.

At the LHA 1040, the LHA 1040 examines its routing table associations for the OCCOA 1122 to determine the destination address at the new CCOA (NCCOA) 1132. The LHA 1040 then encapsulates information packet 1120 to form the fourth information packet 1130. A new source IP address IP-LHA 1131, corresponding to the IP address for LHA 1040, is appended. A new destination IP address NCCOA 1132, corresponding to the new colocated IP address of the MN 1050, is also appended. Except for the encryption, the IP-VPN 1133, OCCOA 1134, ESP 1135, HAIP 1136, VPN-TIA 1137, CNIP 1138, HOA 1139, and payload data 1140 remain unchanged compared to the IP-VPN 1121, OCCOA 1122, ESP 1123, HAIP 1124, VPN-TIA 1125, CNIP 1126, HOA 1127, and payload data 1128 of information packet 1120. This secured information packet 1130 is then transmitted to the MN 1050, which decapsulates and decrypts the information packet 1130 to recover the original information.

FIG. 12 shows an embodiment for the invention for communication between a foreign network and a VPN with a private home address for the MN performing a hand-off from a first sub-network to a second sub-network having a foreign agent. A private home address is an IP address that can only be used within a specific sub-network (e.g. a VPN).

A foreign network 1205 includes two sub-networks. The first sub-network 1204 includes a Local Home Agent (LHA) 1240 routing information packets to a first location for a MN 1250' over communication link 1252. The second sub-network 1242 includes a DHCP 1210 server connected to a buss line 1230 by communication link 1211. A foreign agent (FA) 1235 connects to the buss line 1230 by communication link 1212. A MN 1250 connects to the buss line 1230 by communication link 1251, which is the MN 1250' new location requiring a hand-off Communication link 1251 and communication link 1252 for most mobile IP communication will include a wireless connection (e.g. cellular phone service connection). A communication link 1231 connects the LHA 1240 on the first sub-network to the buss line 1230 of the second sub-network on the foreign network 1205.

The foreign network 1205 connects to the MN's 1250 home network 1280 by communication link 1233 from the LHA 1240 to a VPN-GW 1260 on the home network 1280. The VPN-GW 1260 is a security gateway encrypting and decrypting information packets to and from a VPN 1275 organized on the HN 1280. The VPN 1275 includes a HA 1265 connected to the VPN-GW 1260 by communication link 1261, and a CN 1270 connected to the HA 1265 by communication link 1271.

In this preferred embodiment, a private home address (HOA) designates the IP address of the MN 1250. The VPN-GW 1260 possesses an IP address (IP-VPN) designation. The HA 1265 also possesses an IP address (HAIP) designation, and the CN 1270 has an IP address (CNIP). During a registration procedure at the start of a communication session, a colocated care-of IP address is also assigned to the MN 1250' by the LHA 1240 or a DHCP (not shown) corresponding to the IP address location of the MN 1250' on the sub-network 1244 that is used to route information packets from the VPN 1275 on the home network 1280. During a hand-off procedure when shifting from MN 1250' to MN 1250, a colocated care-of IP address is assigned to the MN 1250 by the DHCP 1210 or the FA 1235 corresponding to the IP address location of the MN 1250 on the sub-network 1242 that is used to route information packets from the sub-network 1244.

Figure 13:
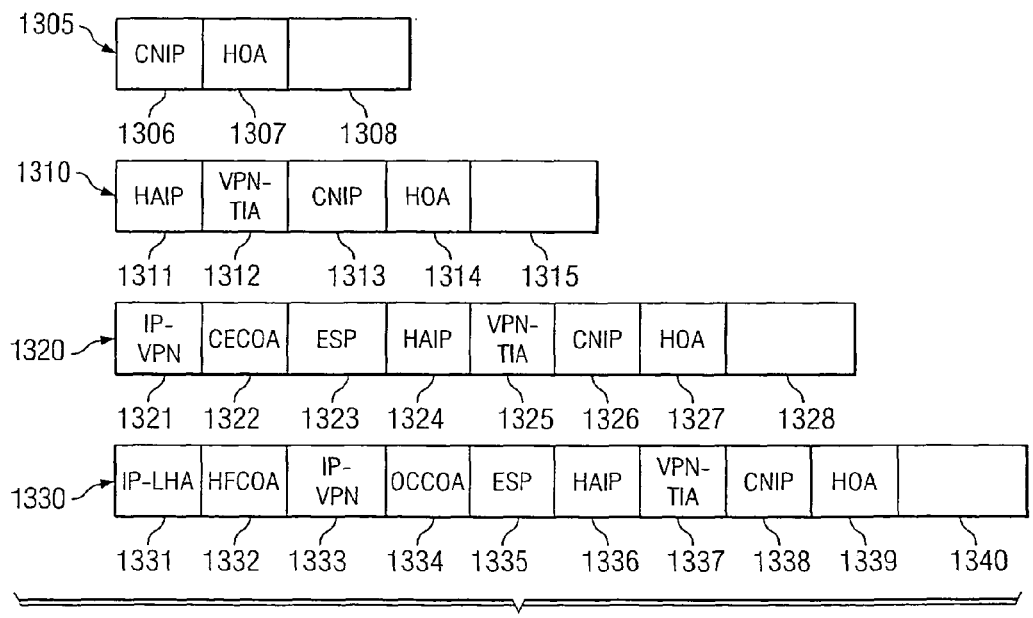
FIG. 13 is the encapsulation process of the information packet for the network of FIG. 12 on the forward path.

FIG. 13 shows the encapsulation process for the invention of the network configuration of FIG. 12 for the forward path. At communication startup, the MN 1250' initiates a registration protocol to obtain a colocated care-of address on the sub-network 1244 from the LHA 1240. The HA 1265 sets up a VPN tunnel with the VPN-GW 1060 by registering a routing table association for the HOA and a VPN tunnel inner address (VPN-TIA) to use for tunneling information packets to the MN 1250'. The colocated care-of address (CCOA) is also registered in a routing table association with private home address designation (HOA) for the MN 1250' on the HA 1265.

Additionally, the VPN-GW 1260 and the MN 1250' perform internet key exchange (IKE) negotiations to exchange encryption keys, methods, and authentication information. This information is used by the security protocol to encrypt the information packet. Acceptable security algorithms for the key exchange include Message Digest 5 (MD5), Secure Hash Algorithm (SHA), and a Diffie-Hellman combination algorithm using a public and private encryption key. A number of encryption algorithms may be available, including Data Encryption Standard (DES), Triple Data Encryption Standard (3DES), Rivest-Shamir-Aldeman (RSA), ElGamal, RC2 and RC4.

The HA 1265 also sets up a VPN tunnel with the VPN-GW 1260 to register an association for the HOA and a VPN tunnel inner address (VPN-TIA) to use for tunneling information packets to the MN 1250'. This VPN-TIA can be setup during IKE negotiations, assigned manually, or by some other means. The LHA 1240 routes information packets to the MN 1250'. After this registration and initialization protocol, communication can occur between the MN 1250' and the CN 1270.

During communication, the MN 1250' changes its connection to a new sub-network 1242 on the foreign network 1205 with a foreign agent 1235. During hand-off registration, the LHA 1240 registers an association for the prior or old CCOA (OCCOA) and the new foreign agent care-of address where the MN 1250 connects. The foreign agent (FA) 1235 or DHCP 1210 assigns a care-of address location for use to route information packets. The LHA 1240 routes information packets addressed to the OCCOA (e.g. the MN 1250' location) to the FA 1235 to forward to the MN 1250 during the communication session.

The first information packet 1305 is transmitted from the CN 1270 to the HA 1265. The CNIP 1306 is the IP address for the CN 1270 and is the source IP address for the information packet 1305. The destination IP address HOA 1307 is the home address designation of the MN 1250. The payload data 1308 in the information packet 1305 is the actual information being transmitted. At the HA 1265, the HA 1265 examines its routing table associations to determine where to forward the information packet 1305. From information in the routing table and routing algorithm, the HA 1265 encapsulates the information packet 1305 to form information packet 1310 for routing to the VPN-GW 1260 by appending a new source and destination IP address.

The information packet 1310 is transmitted from the HA 1265 to the VPN-GW 1260 using communication link 1261. The HAIP 1311 is the IP address for the HA 1265 or source IP address. The destination address VPN-TIA 1312 is the tunnel inner address for the VPN-GW 1260 used to route information packets transmitted within the VPN 1275 to the VPN-GW 1260. The CNIP 1313 and HOA 1314 are the original source and destination IP address respectively and remain unchanged as does the data payload 1315 compared to the CNIP 1306, HOA 1307, and data payload 1308.

At the VPN-GW 1360, the information packet 1310 is encrypted and an ESP 1323 header appended. The encrypted information packet 1310 is then encapsulated to form the third information packet 1320. Information packet 1320 includes the new source IP address IP-VPN 1321, which is the IP address for the VPN-GW 1260. The new destination IP address OCCOA 1322 is the old IP address for the MN 1250' on the sub-network 1244 before changing to MN 1250 on sub-network 1242. The ESP 1323 contains security protocol data. The HAIP 1324, VPN-TIA 1325, CNIP 1326, HOA 1327, and payload data 1328 are encrypted, but otherwise remain unchanged from the HAIP 1311, VPN-TIA 1312, CNIP 1313, HOA 1314, and payload data 1315 in information packet 1310. The information packet 1320 is then transmitted from the VPN-GW 1260 to the LHA 1240 at the old colocated care-of address (OCCOA) 1322 for the MN 1250'.

At the LHA 1240, the LHA 1240 examines its routing table associations for the OCCOA 1322 to determine the destination address at the new foreign agent care-of address (NF-COA) 1332. The LHA 1240 then encapsulates information packet 1320 to form the fourth information packet 1330. A new source IP address IP-LHA 1331, corresponding to the IP address for LHA 1240, is appended. A new destination IP address NFCOA 1332, corresponding to the new connection IP address of the MN 1250, is also appended. Except for encryption, the IP-VPN 1333, OCCOA 1334, ESP 1335, HAIP 1336, VPN-TIA 1337, CNIP 1338, HOA 1339, and payload data 1340 remain unchanged compared to the IP-VPN 1321, OCCOA 1322, ESP 1323, HAIP 1324, VPN-TIA 1325, CNIP 1326, HOA 1327, and payload data 1328 of information packet 1320. This secured information packet 1330 is then forwarded from the FA 1235 to the MN 1250, which decapsulates and decrypts the information packet 1330 to recover the original information.

Figure 14:
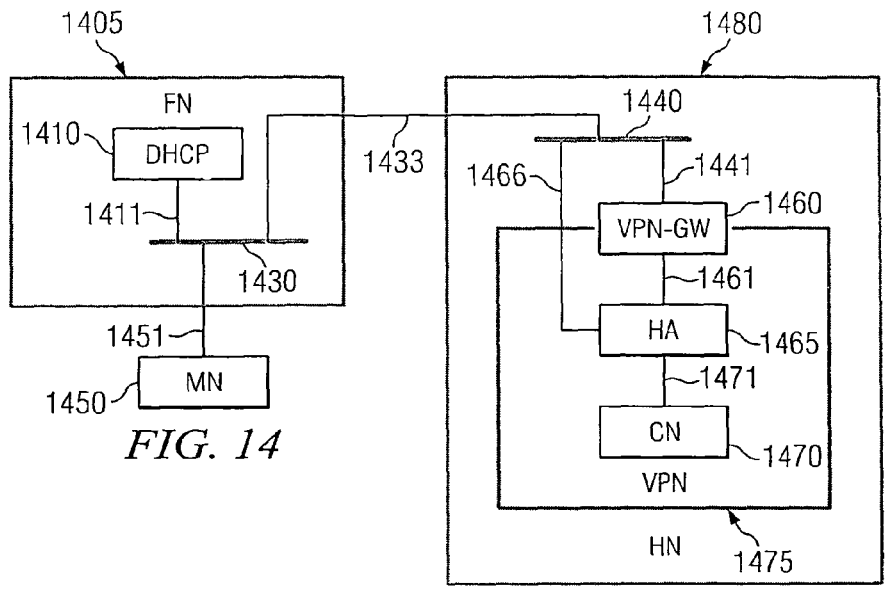
FIG. 14 is a schematic diagram of an architecture for a mobile IP wireless communications network featuring a VPN with a public home address for the mobile node using an optimized communication using the invention.

FIG. 14 shows an embodiment for the invention for an optimized communication between a MN and a VPN with a public home address for the MN. A public home address is an IP address that can be used from any IP-based communication network for Internet communication. An IP communication device connected to an IP network can communicate information packets using this public home address.

A foreign network 1405 includes a DHCP 1410 server connected to a buss line 1430 by communication link 1411. A MN 1450 connects to the buss line 1430 by communication link 1451. Communication link 1451 for most mobile IP communication will include a wireless connection (e.g. cellular phone service connection), but in alternate embodiments this link may be a wired link with the MN 1450 using some type of user plug-in connector (e.g. laptop computer through a phone modem).

The foreign network 1405 is connected to the MN's 1450 home network 1480 by communication link 1433. Communication link 1433 connects the buss line 1430 to a buss line 1440 on the home network 1480. Communication link 1441 links a VPN-GW 1460 to the buss line 1440. The VPN-GW 1460 is a security gateway encrypting and decrypting information packets to and from a VPN 1475 organized on the home network 1480. The VPN 1475 includes a HA 1465 connected to the VPN-GW 1460 by a direct, hard-wired communication link 1461. In this embodiment, the VPN-GW 1460 and HA 1465 can be located inside the same "box." A CN 1470 connects to the HA 1465 by communication link 1471. The HA 1465 also has a communication link 1466 to buss line 1441.

In this preferred embodiment, a public home address (HOA) designates the IP address of the MN 1450. The VPN-GW 1460 possesses an IP address (IP-VPN) designation. The HA 1465 also possesses an IP address (HAIP) designation, and the CN 1470 has an IP address (CNIP). During a registration procedure at the start of a communication session, a colocated care-of IP address is also assigned to the MN 1450 by the DHCP 1410 corresponding to the IP address location of the MN 1450 on the foreign network 1405 that is used to route information packets from the VPN 1475 on the home network 1480.

Figure 15:
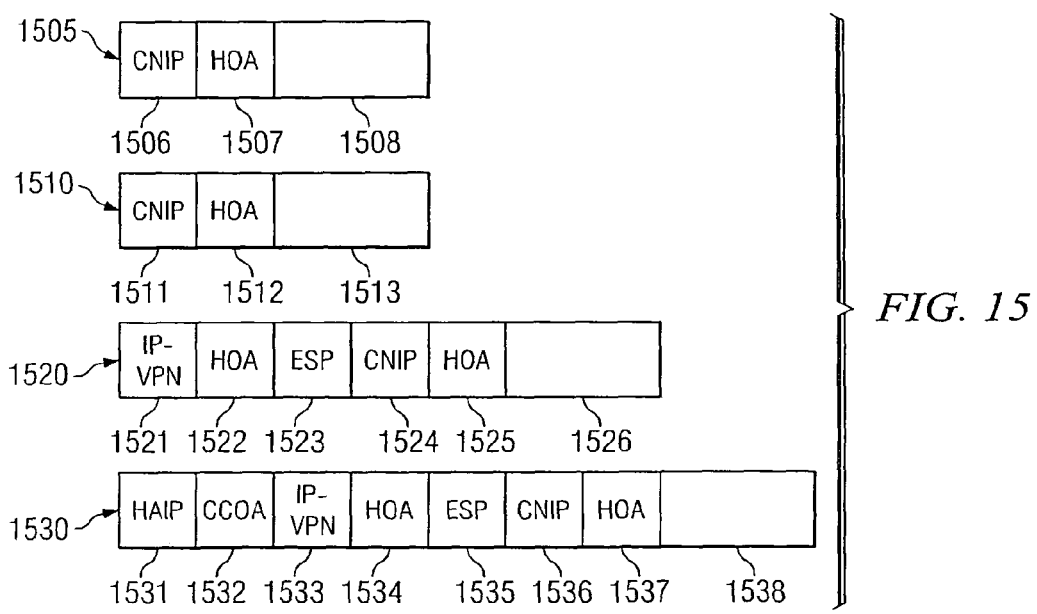
FIG. 15 is the encapsulation process of the information packet for the network of FIG. 14 on the forward path.

FIG. 15 shows the encapsulation process for the invention of the network configuration of FIG. 14 for the forward path communication from the CN to the MN. At communication startup, the MN 1450 initiates a registration protocol to obtain a colocated care-of address on the foreign network 1405 from the DHCP 1410. The HA 1465 sets up a VPN tunnel with the VPN-GW 1460 by registering a routing table association for the HOA and a VPN tunnel inner address (VPN-TIA) to use for tunneling information packets to the MN 1450. The colocated care-of address (CCOA) is also registered in a routing table association with public home address designation (HOA) for the MN 1450 on the HA 1465.

Additionally, the VPN-GW 1460 and the MN 1450 perform internet key exchange (IKE) negotiations to exchange encryption keys, methods, and authentication information. This information is used by the security protocol to encrypt the information packet. Acceptable security algorithms for the key exchange include Message Digest 5 (MD5), Secure Hash Algorithm (SHA), and a Diffie-Hellman combination algorithm using a public and private encryption key. A number of encryption algorithms may be available, including Data Encryption Standard (DES), Triple Data Encryption Standard (3DES), Rivest-Shamir-Aldeman (RSA), ElGamal, RC2 and RC4.

The HA 1465 also sets up a VPN tunnel with the VPN-GW 1460 to register an association for the HOA and a VPN tunnel inner address (VPN-TIA) to use for tunneling information packets to the MN 1450. This VPN-TIA can be setup during IKE negotiations, assigned manually, or by some other means. After this registration and initialization protocol, communication can occur between the MN 1450 and the CN 1470.

The first information packet 1505 is transmitted from the CN 1470 to the HA 1465. The CNIP 1506 is the IP address for the CN 1470 and is the source IP address for the information packet 1505. The destination IP address HOA 1507 is the home address designation of the MN 1450. The payload data 1508 in the information packet 1505 is the actual information being transmitted. At the HA 1465, the HA 1465 examines its routing table associations to determine where to forward the information packet 505 and forwards the information packet 1505, without having to perform an encapsulation for the wired connection 1461, to the VPN-GW 1460. The information packet 1510 is identical to the information packet 1505, and includes CNIP 1513, HOA 1514, and data payload 1513, which are identical to the CNIP 1506, HOA 1507, and data payload 1508.

At the VPN-GW 1460, the information packet 1510 is encrypted and an ESP 1523 header added. The encrypted information packet 1510 is then encapsulated to form the third information packet 1520. Information packet 1520 includes the new source IP address IP-VPN 1521, which is the IP address for the VPN-GW 1460. The new destination IP address HOA 1522 is the IP address for the MN 1450 on the VPN 1480. The ESP 1523 contains security protocol data. The CNIP 1524, HOA 1525, and payload data 1526 are encrypted, but otherwise remain unchanged from the CNIP 1511, HOA 1512, and payload data 1513 in information packet 510.

The information packet 1520 is transmitted from the VPN-GW 1460 back to the HA 1465. The HA 1465 again examines its routing tables entries for an association for the destination address HOA 1522. The HA 1465 then encapsulates information packet 1520 to form the fourth information packet 1530. A new source IP address HAIP 1531, corresponding to the IP address for HA 1465, is appended. A new destination IP address CCOA 1532, corresponding to the colocated IP address of the MN 1450, is also appended. The IP-VPN 1533, HOA 1534, ESP 1535, CNIP 1536, HOA 1537, and payload data 1540 remain unchanged compared to the IP-VPN 1521, HOA 1522, ESP 1523, CNIP 1524, HOA 1525, and payload data 1526 of information packet 1520. This secured information packet 1530 is then transmitted to the MN 1450 using communication link 1466. After arriving at the MN 1450, the MN 1450 decapsulates and decrypts the information packet 1530 to recover the original information.

Figure 16:
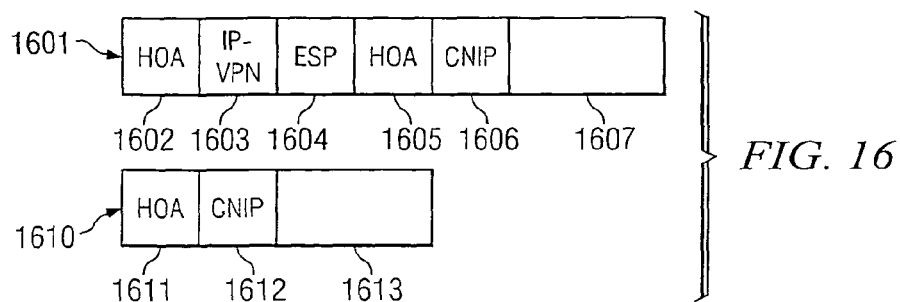
FIG. 16 is the encapsulation process of the information packet for the network of FIG. 14 on the reverse path.

FIG. 16 shows the encapsulation process for the invention of the network configuration of FIG. 14 for information packets transmitted from the mobile node to the correspondence node on the reverse path. Information packet 1601 is formed by MN 1450 for transmission to the CN 1470. HOA 1602 is the source IP address for the MN 1450 on the home network 1480 within the VPN 1475. The IP-VPN 1603 is the destination address for the VPN-GW 1460 securing the VPN 1475. The ESP 1604 header contains data to provide confidentiality and signifies that the remaining portion of information packet 1601 is encrypted. The HOA 1605 is the ultimate public home address for the MN 1450 on the VPN 1475 and the ultimate source address, and the CNIP 1606 is the IP address for the CN 1470 and the ultimate destination address for the information packet 1601. The data payload 1607 is the data actually being transmitted to the CN 1470.

Information packet 1601 is forwarded to VPN-GW 1460 and decapsulated to reveal the encrypted information packet 1610 with the ESP 1604 header appended. The ESP 1604 is processed and the information packet 1610 decrypted. The information packet 1610 includes the source HOA 1611 public home IP address for the MN 1450, the destination CNIP 1612 IP address for the CN 1470, and data payload 1613. The information packet 1610 is forwarded to the CN 1470 where it is decapsulated to reveal the data payload 1613 which can then be processed by the CN 1470.

While the invention has been particularly shown and described with respect to preferred embodiments, it will be readily understood that minor changes in the details of the invention may be made without departing from the spirit of the invention. Having described the invention, we claim:

The invention claimed is:
1. A home network for communicating within a communications network, wherein the communications network comprises the home network and a foreign network, wherein the home network comprises:
   a virtual network;
   a correspondence node in the virtual private network;
   a home agent in the virtual private network; and
   a security gateway between the virtual private network and the home network;
   wherein the home agent is configured to:
   receive an information packet from the correspondence node;
   encapsulate the received information packet with a tunnel address corresponding to the security gateway; and transmit the encapsulated information packet to the security gateway using the tunnel address; and wherein the security gateway is configured to forward the encapsulated packet to the mobile node via the foreign network without using an external home agent.

2. The home network of claim 1, further comprising:
a VPN (virtual private network);
wherein the security gateway is VPN gateway, and wherein the tunnel address is an inner tunnel address of the VPN.

3. The home network of claim 1, wherein the security gateway is configured to forward the encapsulated packet to the mobile node via the foreign network without using an external home agent.

4. The home network of claim 1, wherein the security gateway is further configured to encrypt the encapsulated packet, and transmit the encrypted encapsulated packet to the mobile node via the foreign network.

5. The home network of claim 1, further comprising a virtual private network (VPN), wherein the correspondence node is part of the VPN, and wherein the correspondence node is configured to transmit the information packet to the home agent.

6. The home network of claim 1, wherein:
the security gateway is configured to encrypt the encapsulated packet, and forward the encrypted encapsulated packet to the home agent; and
the home agent is configured forward the encrypted encapsulated packet to the mobile node via a foreign agent.

7. The home network of claim 6, wherein the home agent is configured to forward the encrypted packet out of a virtual private network of the home network.

8. The home network of claim 7, wherein the home agent is configured to append a virtual private network inner tunnel address to the encrypted packet before forwarding the encrypted packet out of the virtual private network to the mobile node.

9. The home network of claim 7, wherein the home agent is configured to forward the encrypted packet out of a virtual private network of the home network using a care-of address of the mobile node.

10. The home network of claim 9, wherein the home agent is configured to append the care-of address to the encrypted packet before forwarding the encrypted packet out of virtual private network to the mobile node.

11. The home network of claim 1, wherein the security gateway is configured to forward the encrypted packet out of a virtual private network of the home network.

12. The home network of claim 1, wherein the security gateway is configured to append a virtual private network inner tunnel address to the encrypted packet before forwarding the encrypted packet out of the virtual private network to the mobile node.

13. The home network of claim 11, wherein the security gateway is configured to forward the encrypted packet out of a virtual private network of the home network using a care-of address of the mobile node.

14. The home network of claim 13, wherein the security gateway is configured to append the care of address to the encrypted packet before forwarding the encrypted packet out of virtual private network to the mobile node.

15. The home network of claim 1, wherein the security gateway is a VPN (virtual private network) gateway.

16. The home network of claim 1, wherein the tunnel address is an inner tunnel address of a virtual private network.

17. The home network of claim 1, wherein the communications network comprises a wireless network.

18. The home network of claim 1, wherein the home network comprises a wireless network.

* * * * *